(12) United States Patent
Jorden (10) Patent No.: US 11,564,363 B2
(45) Date of Patent: Jan. 31, 2023

(54) METHOD OF SUPPORTING THE GROWTH OF AN AGRICULTURAL CROP (71) Applicant: Aquabank Australia Pty Ltd, Hornsby (AU)

(72) Inventor: Vagner Jorden, Hornsby (AU)

(73) Assignee: Aquabank Australia Pty Ltd.

( * ) Notice: Subject to any disclaimer, the term of this patent is extended or adjusted under 35 U.S.C. 154(b) by 0 days.

(21) Appl. No.: 16/338,314

(22) PCT Filed: Oct. 3, 2017

(86) PCT No.: PCT/AU2017/051078
§ 371 (c)(1),
(2) Date: Mar. 29, 2019

(87) PCT Pub. No.: WO2018/058202
PCT Pub. Date: Apr. 5, 2018

(65) Prior Publication Data
US 2020/0022321 A1 Jan. 23, 2020

(30) Foreign Application Priority Data

Sep. 30, 2016 (AU) ................ 2016903985

(51) Int. Cl.
*A01G 24/35* (2018.01)
*C08L 1/28* (2006.01)
(Continued)

(52) U.S. Cl.
CPC ............ *A01G 24/35* (2018.02); *C05F 11/08* (2013.01); *C05G 3/00* (2013.01); *C05G 3/60* (2020.02);
(Continued)

(58) Field of Classification Search
None
See application file for complete search history.

(56) References Cited

U.S. PATENT DOCUMENTS 6,615,539 B1 9/2003 Obonai et al.
2010/0083719 A1 4/2010 Peppmoller et al.
(Continued)

FOREIGN PATENT DOCUMENTS

WO 1991005459 A1 5/1991
WO 2007084550 A2 7/2007

*Primary Examiner* — Wayne A Langel
(74) *Attorney, Agent, or Firm* — Morriss O'Bryant Compagni Cannon, PLLC (57) ABSTRACT A method is disclosed of in-situ retention and buffering of an amount of water in soil to support the growth of an agricultural crop. The method comprises the step of adding an effective amount of a hydrogel material as a water retention agent during planting of seed in the soil. The hydrogel material including an insoluble, cross-linked carboxymethyl cellulose. Once penetration of water into the soil is allowed after the planting of seed, a proportion of the water which penetrates the soil is absorbed by the hydrogel material and, over time, the absorbed water is released by diffusion into the soil to support the growth of the agricultural crop. Also disclosed is the hydrogel material which comprises said carboxymethyl cellulose which has been cross-linked with a cross-linking polymer from the group consisting of: an amine monomer; an amide monomer; and an amine-amide co-polymer.

14 Claims, 5 Drawing Sheets (S/Pol = without polymer; C/Pol = with polymer)

(51) Int. Cl.
*C09K 17/32* (2006.01)
*C05F 11/08* (2006.01)
*C05G 3/00* (2020.01)
*C05G 3/60* (2020.01)
*C05G 3/80* (2020.01)

(52) U.S. Cl.
CPC ............... *C05G 3/80* (2020.02); *C08L 1/286* (2013.01); *C09K 17/32* (2013.01)

(56) References Cited

U.S. PATENT DOCUMENTS

2015/0291480 A1    10/2015    Nakajima et al.
2017/0196175 A1*    7/2017    Shani ..................... C05G 3/60

* cited by examiner

FIGURE 1
(Irr = Irrigated fully; Def = Deficient irrigation; SupDef = Super deficient irrigation).

FIGURE 2
(S/Pol = without polymer; C/Pol = with polymer)

FIGURE 3
(S/Pol = without polymer; C/Pol = with polymer)

FIGURE 6
(Irr = Irrigated fully; Def = Deficient irrigation; SupDef = Super deficient irrigation)

FIGURE 7
(S/Pol = without polymer; C/Pol = with polymer)

FIGURE 8
(S/Pol = without polymer; C/Pol = with polymer)
(Irr = Irrigated fully; Def = Deficient irrigation; SupDef = Super deficient irrigation)

FIGURE 9
(Irr = Irrigated fully; Def = Deficient irrigation; SupDef = Super deficient irrigation).

FIGURE 10
(S/Pol = without polymer; C/Pol = with polymer)

FIGURE 11
(S/Pol = without polymer; C/Pol = with polymer)

METHOD OF SUPPORTING THE GROWTH OF AN AGRICULTURAL CROP

TECHNICAL FIELD

This disclosure relates generally to soil water retention and more particularly, but not exclusively, to the use of water retention agents suitable for use in the agricultural industries. The disclosure is also concerned with the addition of other materials with the water retention agents as a means of optimising agricultural performance.

BACKGROUND OF THE DISCLOSURE

Plants require water to grow and thrive. In commercial agriculture, the availability of water is a key factor determining the viability of a farming enterprise. Some of the factors which influence water availability include:
  Frequency (periodicity) and quantity of rainfall, which is difficult to predict;
  Limitations on water extraction licenses (from rivers, lakes or aquifers); and
  Availability of water storage and irrigation systems.

There can also be limitations on agricultural productivity due to declining soil quality from over-use of irrigation (leaching), erosion, and the presence of residual fertiliser materials. In order to maintain an income stream, farmers often turn to other approaches, which may be costly and/or problematic for other reasons. Such approaches include:
  Clearing of land, to bring more of it into production;
  Over-exploitation of existing land by overcropping, over-fertilizing;
  Investing in costly irrigation and/or water storage systems; and
  Purchasing and using more fertiliser than is needed (a significant proportion can be wasted due to run-off, leaching, and so on).

Apart from attempting to access more water, a farmer can also seek amendment of the soil by:
  Manuring—well manured soil has better soil retention properties, but there are significant cost and hygiene issues;
  Use of fertiliser—nitrogen, phosphorus and potassium (NPK) can be added in various forms, either as amendment to irrigated water, or by dry application to soil surface or during tilling or plowing. However, NPK fertiliser use can be poorly targeted and over-used, and is subject to leaching into the ground water. There is also the possibility of plant leaf burn from the use of NPK fertiliser; and Use of water retention agents—
  It is known to increase the water holding capacity of many products using agents which fall under the general category of hydrogels (also referred to as super-absorbent polymers (SAPs)). These products can swell upon contact with water and absorb many multiples of their initial weight in water;
  The water absorbency and water retention properties of hydrogels are broadly applied in disposable nappies/diapers and sanitary products, as well as for use as viscosity modifiers, drilling aids and food additives;
  Hydrogels occur in numerous forms including liquids of a wide viscosity range, powders, and water storage "crystals", which are made of synthetic materials such as acrylamide and polyacrylamide copolymer. The performance of such products relies on the physio-chemical properties of the polymers to absorb water, and then to release it over time;
  Synthetic hydrogel materials (polyacrylamide, polyacrylate and related products) are produced from hydrocarbon-based feedstock, but these can be problematic in use. The use of polyacrylamide is declining in favour of alternative synthetics, due to the potential for break-down of the acrylamide monomer, and various suspected side effects of this compound.

There remains a need for a farmer to be able to access and retain more water to facilitate crop growth in an efficient manner and at lowest possible cost, to overcome the water supply limitation issues mentioned, and to avoid entering into costly capital expenditure to improve agricultural productivity to maintain an income stream.

SUMMARY

In a first aspect, embodiments are disclosed of a method of in-situ retention and buffering of an amount of water in soil to support the growth of an agricultural crop, the method comprising the steps of: adding an effective amount of a hydrogel material as a water retention agent during planting of seed in the soil, said hydrogel material including an insoluble, cross-linked carboxymethyl cellulose; and causing or allowing penetration of water into the soil after the planting of seed; wherein a proportion of the water which penetrates the soil is absorbed by the hydrogel material and, over time, the absorbed water is released by diffusion into the soil to support the growth of the agricultural crop.

The step of causing water to penetrate the soil after seed planting can comprise any means of applying water to the soil or ground comprising hosing, sprinkler irrigation, drip irrigation, or aerial delivery of water or any other system which may be manually or automatically controlled.

In certain embodiments, the hydrogel material comprises said carboxymethyl cellulose which has been cross-linked with a cross-linking polymer from the group consisting of: an amine monomer; an amide monomer; and an amine-amide co-polymer.

In certain embodiments, the amide polymer is from the group consisting of: acrylamide; methacrylamide; ethacrylamide; isopropylacrylamide; diacetoneacrylamide; bisacrylamides; acrylic acid; acrylate; acrylonitrile; and acrylamido-propanesulfonic acid.

In certain embodiments, the amine polymer is from the group consisting of: polyallylamine hydrochloride; polyvinylamine (PVAm); polyvinylformamide (PNVF); and poly(vinylformamide-co-vinylamine) co-polymers (which is an amine-amide co-polymer). For example, polyvinylamine is prepared by the hydrolysis of poly(Nvinylformamide) (PNVF), and it is feasible that a partial hydrolysis may yield a range of potential PNVF-co-PVAm copolymers between the PNVF and PVAm homopolymers.

In certain embodiments, the hydrogel material further comprises an ionic solid. In one form of this, the ionic solid comprises particulates which are impregnated into, dispersed throughout, and bound by, the hydrogel material. In one form of this, the ionic solid is from the group consisting of: sodium hydrogen carbonate, and sodium carbonate.

In certain embodiments, the carboxymethyl cellulose comprises from 3 to 85% w/w of the hydrogel material. In one form of this, the carboxymethyl cellulose comprises from 10 to 70% w/w of the hydrogel material. In a further form of this, the carboxymethyl cellulose comprises from 20 to 60% w/w of the hydrogel material.

In certain embodiments, the cross-linking polymer comprises from 1 to 25% w/w of the hydrogel material. In one form of this, the cross-linking polymer comprises from 2 to 15% w/w of the hydrogel material. In a further form of this, the cross-linking polymer comprises from 3 to 10% w/w of the hydrogel material.

In certain embodiments, the ionic solid comprises from 1 to 10% w/w of the hydrogel material. In one form of this, the ionic solid comprises from 2 to 7% w/w of the hydrogel material.

In certain embodiments, the hydrogel material and the seed are introduced into the soil during planting, with the hydrogel material being introduced at a location where the root zone of the agricultural crop will form. In one particular embodiment, the hydrogel material is added into the soil in a first step, and the seed is added into the soil in a second step at a location above the hydrogel material.

In certain embodiments, the hydrogel material is added to the soil via a separate dosing box to the seed.

In certain embodiments, the effective amount of the hydrogel material added to the soil is at a predetermined rate of from 1.0 to 10.0 kg per hectare. In one particular embodiment, the hydrogel material is added to the soil at a predetermined rate of from 1.5 to 9.0 kg per hectare. In a further particular embodiment, the hydrogel material is added to the soil at a predetermined rate of from 1.55 to 8.85 kg per hectare. In a further particular embodiment, the hydrogel material is added to the soil at a predetermined rate of from 1.55 to 4.70 kg per hectare. In a further particular embodiment, the hydrogel material is added to the soil at a predetermined rate of from 2.95 to 8.85 kg per hectare.

In certain embodiments, the hydrogel material is added in a solid form selected from the group consisting of: a pellet, a granular particle, a powder or a crystal. In one particular embodiment, the hydrogel material has a particulate size of 80% less than 5 millimetres.

In certain embodiments, the hydrogel material is formulated to a predetermined bulk density, so that dose rate to the soil can be controlled. In one particular form of this, the hydrogel material has a predetermined bulk density of from 0.50 to 0.60 kg per cubic metre.

In certain embodiments, the method further comprises the step of supplying at least one co-factor with the hydrogel material to increase agricultural crop yield. In one particular form of this, the step of absorption of at least one co-factor into the hydrogel material occurs prior to its use. In one particular embodiment, the co-factor is any of the group consisting of: nutrients, fertilisers (NPK, or PK only), pesticides, microorganisms, essential elements, nitrogen-fixing bacteria including Rhyzobia inoculation.

In certain embodiments, the agricultural crop is from broad acre farming. In one particular embodiment, the agricultural crop is soybeans (also known as soya beans). In one particular embodiment, the agricultural crop is legumes.

The inventor has discovered that the use of a non-synthetic hydrogel material in the growth of an agricultural crop can have many advantages. An example of a non-synthetic hydrogel for this purpose can be the use of cross-linked carboxymethyl cellulose (X-CMC).

Carboxymethyl cellulose (CMC) is a naturally-derived hydropolymer prepared by alkali-catalysed reaction of cellulose with (mono) chloroacetic acid (MCA). The alkali used can be sodium hydroxide. The carboxyl groups render the cellulose soluble and chemically reactive. The functional properties of CMC depend on the degree of substitution of the cellulose structure (that is, how many of the hydroxyl groups have taken part in the substitution reaction), as well as the chain length of the cellulose structure. The inventor has used CMC with a degree of substitution (DG) of 1.2 in the experimental work so far.

Base cellulose is obtained from all manner of plant materials (wood pulp, cotton linters, bagasse, saw dust, used paper, and so on). In certain embodiments, the non-synthetic hydrogel CMC may be cross-linked into a semi-synthetic hydrogel form. This is because a semi-synthetic X-CMC material may be the result of modifying CMC with many types of synthetic cross-linking monomers.

The sodium salt of X-CMC is water soluble, and the degree of substitution (carboxymethyl groups per cellulose monomer unit) affects the product and viscosity. X-CMC with a sufficiently high degree of substitution is more water soluble (more ionic) and less viscous. However, crosslinking of CMC also affects water solubility. With an increasingly high degree of crosslinking, X-CMC becomes less water soluble. At a certain degree of cross linking, X-CMC will be insoluble, but retain high water absorbency characteristics. X-CMC is biodegradable and non-toxic, which makes it very suitable for agricultural applications.

The inventor believes that the use of such non-synthetic and semi-synthetic hydrogels can increase water holding capacity of soils and, as a result, reduce the leaching of nutrients away from the roots. This is because the hydrogels, once wet, will expand to retain moisture so as to act as a "buffer" or localised reservoir for the moisture in the soil. That moisture will be released by diffusion over time into the soil on those occasions when rainfall is low and the supply of irrigation water is limited.

The retention of water in the non-synthetic and semi-synthetic hydrogel product also means that dissolved nutrients from fertiliser (such as NPK) can be retained and be available for release with the water, rather than being lost with run-off or leaching into the water table.

In addition, the hydrogel can also act as a means of slow release of the co-factors mentioned, which can have several beneficial synergistic effects.

In a second aspect, embodiments are disclosed of a hydrogel material comprising an insoluble, crosslinked carboxymethyl cellulose together with particulates of an ionic solid which are impregnated into and bound by the hydrogel material, the hydrogel material arranged in use for both absorption of water from, and diffusion release of water back into, a surrounding body. In one example, the surrounding body is farm soil used for agriculture.

In certain embodiments, the carboxymethyl cellulose is crosslinked by a polymer from the group consisting of: an amine monomer; an amide monomer; and an amine-amide co-polymer.

In certain embodiments, the amide polymer is from the group consisting of: acrylamide; methacrylamide; ethacrylamide; isopropylacrylamide; diacetoneacrylamide; bisacrylamides; acrylic acid; acrylate; acrylonitrile; and acrylamido-propanesulfonic acid.

In certain embodiments, the amine polymer is from the group consisting of: polyallylamine hydrochloride; polyvinylamine (PVAm); polyvinylformamide (PNVF); and poly (vinylformamide-co-vinylamine) co-polymers.

In certain embodiments, the ionic solid is from the group consisting of: sodium hydrogen carbonate, sodium carbonate.

In certain embodiments, the weight percentage composition of carboxymethyl cellulose, cross-linking polymer or ionic solid are otherwise as defined for the method defined in the first aspect.

In a third aspect, embodiments are disclosed of an insoluble hydrogel material comprising a carboxymethyl cellulose containing dispersed particulates of an ionic solid, the carboxymethyl cellulose being crosslinked by a polymer from the group consisting of: an amine monomer; an amide monomer; and an amine-amide co-polymer; said hydrogel material arranged in use for both absorption of water from, and diffusion release of water back into, a surrounding body. In one example, the surrounding body is farm soil used for agriculture.

In certain embodiments, the insoluble hydrogel material is otherwise as defined for the hydrogel material defined in the second aspect.

Throughout this specification, when the term "insoluble" is used in relation to the cross-linked carboxymethyl cellulose, it is understood that, like most substances held in water, there will be some sparing solubility as opposed to a greater tendency to dissolve or fragment into solution. Over a long period of time (for example, 12 months) and with continual usage, X-CMC will biodegrade and thus eventually will lose its chemical form and its efficacy as a water absorption and release agent. The biodegradation of X-CMC may generate soluble by-products. However, this natural breakdown into soluble products is distinct from the intended use of the X-CMC as a non-synthetic or semi-synthetic hydrogel product for repeated water retention and release action.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments which will be described.

DETAILED DESCRIPTION

This disclosure relates to the features of a method of in-situ retention of water in soil to support the growth of an agricultural crop using a non-synthetic and/or semi-synthetic hydrogel.

To retain water for use in an agricultural situation, a hydrogel or cross-linked polymer is formed using cross-linked carboxymethyl cellulose (CMC), having a water retention capacity depending on the extent of cross-linking which is achieved. In the present example, the X-CMC hydrogel was produced by cross-linking with a relatively lower molecular weight polymer, in this instance the cross-linker being polyallylamine hydrochloride (PAH), an amine monomer. These two polymers interact synergistically via polar or ionic bonds to form the X-CMC hydrogel. Once reacted, the cross-linked structure will then degrade only slowly (perhaps over a year or more) when placed in a soil environment.

The CMC is higher molecular weight, and the PAH has a lower molecular weight, and the two polymers represent a majority of the composition of the solid hydrogel material. Overall the X-CMC represents as much as 85% w/w of the hydrogel material, and in some other embodiments being less than 70% w/w, or less than 60% w/w. Overall the cross-linker monomer PAH represents as much as 25% w/w of the hydrogel material, and in some other embodiments being less than 15% w/w, or less than 10% w/w.

The hydrogel material is produced and then stored as a dry solid, and can be broken up into particle pieces for distribution over, and placement within, the soil, as will be described.

In further examples, the cross-linker can also be an amide monomer such as acrylamide, acrylic acid or acrylate, which would result in a semi-synthetic X-CMC hydrogel being produced.

Also present in the hydrogel material used in the present experiments is an ionic salt solid, present as mainly sodium bicarbonate, with a lesser amount of sodium carbonate monohydrate. The function of the ionic solid salt is to assist the hydrogel to take up water more quickly. Without wishing to be bound by theory, the inventor surmises that the ionic solid provides a substrate which creates an osmotic pressure gradient to help draw water towards the ionic solid, and therefore assists the polymers to capture the water more quickly.

With use, there is of course some slow dissolution of the ionic salt solid particles over time, passing out of the X-CMC hydrogel. Overall the ionic salt solids represent less than 10% w/w of the X-CMC hydrogel material, in some other embodiments being less than 7% w/w, or less than 5% w/w, or about 2% w/w or about 1% w/w. The ionic solid is present as small particulates which are bound by, or impregnated into, the X-CMC hydrogel structure.

In one exemplary embodiment, the above-mentioned hydrogel material including cross-linked carboxymethylcellulose (X-CMC) was introduced in granular form as a water retention agent placed in the surrounding soil during broad acre cultivation of a crop of soybeans. Experiments were conducted on different dosages of this product up to 10.0 kg/hectare of cultivated land, and compared with cultivation results without this agent being present. From these experiments, an understanding has developed of what represents an effective amount of the X-CMC hydrogel, and to what extent the cross-linking needs to be, to provide an insoluble, highly water absorbent material, which also has the advantages of being biodegradable and non-toxic. Other advantages have also been determined.

The X-CMC hydrogel was added with the seed at the time of plowing and sowing/planting. The granular, particulate X-CMC hydrogel was allowed to flow from a storage vessel, via a vibrating delivery feeder, at a specific rate into the plowed furrow of earth, as the feeder moved along the length of the furrow. The dry granular X-CMC hydrogel is formulated to a specific bulk density so that the dose rate to soil can be controlled. Separately, or at least after the X-CMC hydrogel was added, the seed was then allowed to flow from its own storage vessel, via a vibrating delivery feeder, into the plowed furrow of earth, as the feeder moved along the length of the furrow. This meant that the X-CMC hydrogel was introduced at a location where the root zone will form from the agricultural crop which arises from the seeds, the seeds being at a location above the X-CMC hydrogel particles.

After the seed and X-CMC hydrogel were added, and the soil was tilled over to cover these materials, and the earth was then initially irrigated to cause penetration of water into the soil so as to allow wetting and water absorption by the hydrogel material, resulting in the formation of small water-rich reservoirs embedded in the earth. The initial wetting of the particulates was observed to induce some swelling during water absorption. The swollen hydrogel becomes part of the soil matrix. The roots of the growing plant propagate through the soil/hydrogel matrix.

When the soil surrounding these particulates of X-CMC hydrogel becomes wet, such particulates will retain their absorbed moisture content. When the soil surrounding these particulates begins to dry out, the water associated with the X-CMC will migrate out by diffusion/osmosis over time, so as to add moisture back into the bulk soil, and directly in the root zone of the plants. The swelling process is reversible as the absorbed water is released over time for take-up by the plant. Such a release can support the growth of an agricultural crop.

In the experimental work, the X-CMC hydrogel particulate material which was added had a particulate size of 80% less than 5 millimetres, with a large proportion of particulates being below 2 millimetres in particle diameter. The bulk density of the X-CMC hydrogel was around 0.55 kg per cubic metre, but variations between 0.50 and 0.60 kg per cubic metre were used. The particle size and the bulk density properties determine how the vibratory feeder will operate, and thus control the dose rate of delivery to the soil.

Experimental Field Trial Study 1

Objectives

The objective of the experimental study was to compare the responsiveness of two soybean genotypes in an agricultural cultivation environment, to identify the effect on product yield of the dosage rate per unit area of hydrogel material (which includes the X-CMC polymer) of the present disclosure.

Experimental Design and Analysis of the Data

To understand the effect of the dosage of the cross-linked polymer with selected soybean genotypes, an experimental cultivation situation was devised with restricted irrigation of water supplied to the crop so as to place it in moisture stress, and with a standard base level of fertilisation (250 kg/ha) in place in all cases. The yield of soybeans of genotypes BRS 7680RR and BRS 7780IPRO being cultivated in this experiment was measured when the soil was conditioned using four different doses of the cross-linked polymer (kg/ha). The results are shown in Table 3.

The results indicate that as the dose of cross-linked polymer is increased, the cultivation yield also increases until it reaches a peak at 3.125 kg/ha, after which the use of additional amounts of polymer appears to cause a decrease in the cultivation yield. Without wishing to be bound by theory, the inventor surmises that the additional polymer may have caused the ground in the region of the plant roots to become too wet, so as to cause root rot, or to hold so much moisture that the plant roots were unable to reach sufficient nutrients (and in fact nutrients such as the fertiliser may also have been washed away).

When considering the median yield averaged over four different doses of the cross-linked polymer (kg/ha) (including zero), the yield of soybeans of genotype BRS 7680RR being cultivated in this experiment was increased by 22%, and for BRS 7780IPRO the yield of soybeans was increased by 10%.

It therefore appears that beneficial yield improvements can come from the use of an effective amount of cross-linked polymer to stabilise and support the growth of an agricultural crop such as soybeans. Furthermore, in some instances, unexpectedly there appears to be an optimal dose of cross-linked polymer which maximises the advantages of an in-situ water retention and buffering means.

In a further study made to understand the effect of the dosage of the cross-linked polymer with selected soybean genotypes, an experimental cultivation situation was devised with all of the same conditions as in the previous example, but with a standard base level of fertilisation which is higher (470 kg/ha) in place in all cases. The yield of soybeans of genotypes BRS 7680RR and BRS 7780IPRO being cultivated in this experiment was measured when the soil was conditioned using four different doses of the cross-linked polymer (kg/ha), to much higher levels than used in the previous example. The results are shown in Table 4.

For the genotype BRS 7680RR, the results indicate that as the dose of cross-linked polymer is increased, there does not seem to be the same cultivation yield "peak" as observed in the previous example, but rather the increased yield reaches a plateau. This may indicate that the previous theory of the loss of sufficient nutrients from the root region of the plants was correct, and that these results show the yield possibility from using a powerful combination of sufficient fertiliser and even higher doses of the cross-linked polymer (kg/ha). When considering the median yield averaged over four different doses of the cross-linked polymer (kg/ha) (including zero), the yield of soybeans of genotype BRS 7680RR being cultivated in this experiment was increased by 16%.

However, when considering the median yield averaged over four different doses of the cross-linked polymer (kg/ha) (including zero), the yield of soybeans of genotype BRS 7780IPRO was not increased at all (a slight decrease of 4% is observed) and the polymer had no effect.

Therefore, from this data it appears that the use of an effective amount of cross-linked polymer to stabilise and support the growth of an agricultural crop such as soybeans can be used as a complementary soil additive to increase the performance of poorer yielding genotypes. The results in Table 4 indicate that the generally poorer yielding genotype BRS 7680RR (2150 yield at zero polymer) can be caused to achieve a very similar yield to the better-yielding genotype BRS 7780IPRO (2888 yield at zero polymer), at the same level of fertiliser, if a cross-linked polymer is added to the soil at a dose of around 5.9 to 8.8 kg/ha along with genotype BRS 7680RR. In such instances, the BRS 7680RR now achieves a very similar yield to the BRS 7780IPRO without any cross-linked polymer.

TABLE 3

Yield of soybeans of genotypes BRS 7680RR and BRS 7780IPRO cultivated using four different doses of cross-linked polymer (kg/ha), with base level fertilisation (250 kg/ha) in place in all cases.

| Dose Polimero | Cultivar | |
| --- | --- | --- |
| | BRS 7680RR | BRS 7780IPRO |
| | Adubação (kg/ha) | |
| (kg/ha) | 250 | 250 |
| 0 | 1527.0 c B | 1913.6 b A |
| 1,562 | 1939.4 b B | 2122.5 b A |
| 3,125 | 2216.1 a A | 2371.6 a A |
| 4,687 | 1755.0 c B | 2042.3 b A |
| Media | 1859.35 B | 2112.47 A |

TABLE 4

Yield of soybeans of genotypes and BRS 7680RR and BRS 7780IPRO cultivated using four different doses of cross-linked polymer (kg/ha), with base level fertilisation (470 kg/ha) in place in all cases.

| Dose Polimero | Cultivar | |
| --- | --- | --- |
| | BRS 7680RR | BRS 7780IPRO |
| | Adubação (kg/ha) | |
| (kg/ha) | 470 | 470 |
| 0 | 2150.2 b B | 2888.2 a A |
| 2,937 | 2489.1 a B | 2754.3 a A |
| 5,875 | 2713.7 a A | 2698.5 a A |
| 8,812 | 2658.6 a A | 2743.6 a A |
| Media | 2502.87 B | 2771.17 A |

In summary, these experimental results produced by the inventor using a predetermined range of X-CMC hydrogel dosages added to the soil, gave beneficial outcomes in comparison with the baseline case (that is, without the X-CMC hydrogel being used), and data which demonstrated that:

At X-CMC hydrogel doses in the range between 1.562 kg/ha and 8.812 kg/ha there were increases in soybean yield of between 10% to 22%;

A lower dose of fertiliser was required when using X-CMC hydrogel—whereas the usual dose was 1.0 tonne/ha of fertiliser when not using X-CMC hydrogel, the experimental trials showed that yield increases were still observed even when much lower fertiliser doses of 0.25 tonne/ha and 0.47 tonne/ha were used. (The fertiliser used in soybean production was non-N, that is, 0-25-20 NPK).

There also were also visual indications that use of the X-CMC hydrogel enhanced the photosynthetic capacity/performance of the plant, since the plants appeared healthier overall, for example in leaf area measurement. It was decided that a more detailed study of plant morphology was then required, to more closely understand this.

Experimental Field Trial Study 2

Objectives

The objectives of the experimental study were to compare the drought tolerance and irrigation responsiveness of three soybean genotypes in an agricultural cultivation environment, to identify possible physiological mechanisms linked to drought tolerance, and the effect of the hydrogel material (which includes the X-CMC polymer) of the present disclosure on that drought tolerance.

Water stress is known to affect the development of legumes, including bean and soybean cultivation, by causing root and shoot dry matter reduction when such plants are exposed to water deficit situations during growth. Reductions in weight and enzyme activity are measurable, and are a reflection of a severe water deficit on carbon and nitrogen metabolism by the plant.

Monitoring plant parameters that confer greater tolerance to drought can be used as a technique to characterise the success or failure of any changes being made, and ultimately find a real-time use so that a crop can pass through such events and maintain overall productivity and yield. Monitoring can include such physiological measurements as photosynthesis, stomatal opening, transpiration, leaf area, plant height, final stand, plant stem diameter, antioxidant system activity and the production of osmoregulatory compounds.

Experimental Design and Statistical Analysis of the Data

A farm location used for growing soybeans in Brasil was selected. The experimental design involved a crop cultivation installation, organised with a randomised block design arranged into subdivided plots, the subplots arranged with four different irrigation water inputs.

The studied crop comprised 3 genotypes of soybean (NA5909, BRS5980IPRO and BRS7280RR) cultivated in all four irrigation zones, and three replications were used. Each agricultural plot consisted of two lines of plants, separated by a 1 m border on each side of these lines, the first lines having the optimal dose of water, and the water input amount decreasing over a water gradient when moving from zone to zone transversely across the elongate crop rows. The experiments were conducted so that the only limiting factor in the system was water—that is, with the same preventive control of diseases and pests, non-limiting fertilisation and effective weed control.

The other substances added to all of the experimental crop irrigation zones were Glyphosate (3.0 L/ha), Aurora (80 mL/ha), mineral oil (1.0 L/ha) and urea (1 kg/ha) for the control of invasive plants. For planting, 500 kg/ha of a fertiliser was used in the planting, plus inoculation with *Rhizobium* developed for soybeans. Plants were arranged at 5 plants per linear metre. Herbicides under the trade name Soyvance (150 g/ha) and Imazhetaphir (1.0 L/ha) were also applied in order to control all weeds, these having a broad spectrum of action. Pesticides such as Adesil (100 mL/ha) were also added at various leaf growth and flowering stages for control of caterpillars (*Anticarsia gemmatalis* and *Helicoverpa armigera*) and bedbugs (*Euschistus heros, Piezodorus guildinii* and *Nezara viridula*).

An adjustable speed irrigation sprinkler mounting bar with a cross-span width of 20 m was used to irrigate the crop, the bar arranged to extend transversely across the crop rows, the entire device also being motorised to move lengthwise alongside the crop rows. The sprinkler bar was fitted with water sprinkler outlets directed downwardly at the field below. To produce different water flow rates, the spacing of the sprinklers was arranged to deliver a decreasing gradient of water when moving along the length of the mounting bar. By spacing the sprinklers further apart from one another, the inventor delinated four different irrigation zones along the bar, representing the four water irrigation zones at ground level. The water quantity/use was monitored by sample collection of water applied at each zone of irrigation, as well as taking samples of soil moisture using gravimetric measurement methods.

Morphological and Productivity Parameters

The morphological parameters of the soybean plants were measured and counted, namely: plant height, pod insertion, number of pods, root weight, number of internodes, collection diameter, total length of the last four internodes and mass weight of one thousand grains.

Results and Discussion

The selected soybean genotypes were planted in the winter and therefore outside the traditional planting season, reaching a yield of up to 3200 kg/ha.

Figure 1:
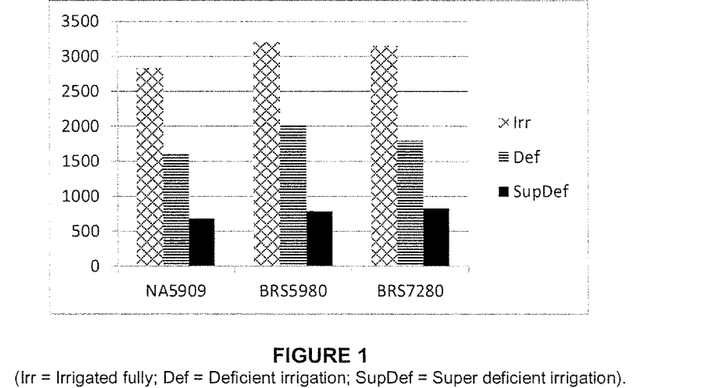
FIG. 1 shows measurements of the response to irrigation and drought tolerance in terms of yield from three soybean genotype materials, in accordance with the prior art.

A similar trend in response to irrigation was observed in all genotypes (as shown in FIG. 1, no polymer used). In severe stress conditions the genotypes were equivalent in terms of productivity, but at the intermediate and highest irrigation levels, the BRS5980 genotype stood out as being the most productive.

Figure 2:
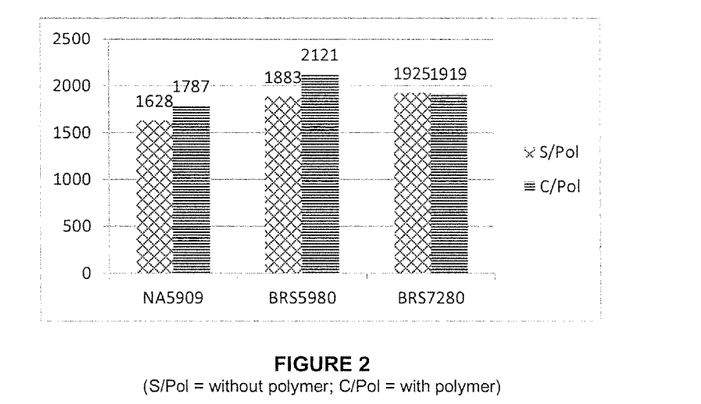
FIG. 2 shows measurements of the effect of the cross-linked polymer application on the average yield of three soybean genotypes, in accordance with a first embodiment of the present disclosure.

According to FIG. 2, there was a small positive response in crop yield with the application of the cross-linked polymer, but this was not observed for the BRS7280 genotype. This genotype showed a slower and longer growth pattern than the others, so it is possible that desiccation at the end of the cycle may also have shown a reduction in the productive capacity of this material.

Figure 3:
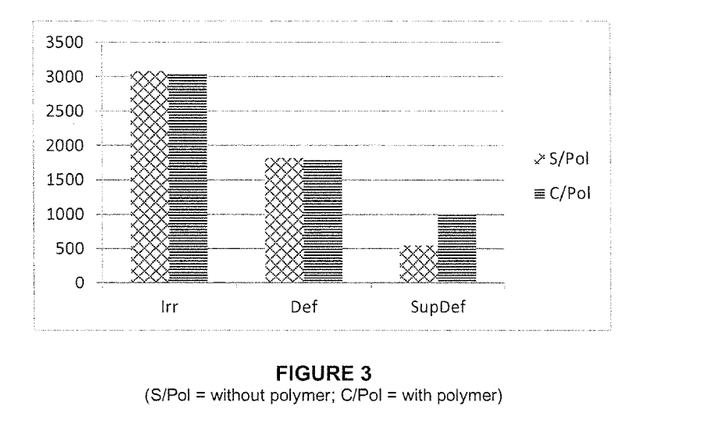
FIG. 3 shows measurements of the effect of the application of the cross-linked polymer on soybean yield at three levels of irrigation, in accordance with a further embodiment of the present disclosure.

It was notable that the positive effect in crop yield with the addition of cross-linked polymer was pronounced in conditions which have the most severe moisture stress (FIG. 3). Of course, such conditions are not always present in agriculture, for instance when soybeans are planted in the rainy season. Thus, it appears that the best application for the use of the cross-linked super absorbent polymer may be in more marginal farm cultivation areas which have unfavorable or uneven rainfall rates, or poor distribution of rainfall, or a tendency for a prolonged summer, where the maximum advantage of the adoption of the use of a cross-linked polymer as an in-situ water retention and buffering means may occur.

Analysis of the results achieved without the presence of the cross-linked polymer in individual experiments showed a significant statistical difference for all the studied parameters when only the water factor was observed. However, for the genotype factor, there were no statistical variations between the morphophysiological and productivity parameters. There was only interaction between the water and genotype factors for the parameters of: Thousand Grain Weight, Grain Density and Half Day Water Potential (Table 1).

On the other hand, analysis of the results achieved with the presence of the cross-linked polymer in individual experiments showed that while there were statistically significant difference for all parameters studied when only the water factor is considered, for the genotype factor there were statistically significant differences for the morphophysiological and productivity parameters, namely: Number of Between Nodes and Diameter. There was only interaction between the water and genotype factors for the parameters Transpiration and Number of Pods (Table 2).

The data demonstrates that for experiments using polymer addition, and for experiments without the polymer addition, there was no statistically superior genotype when considering photosynthesis (A), stomatal conductance (B) and transpiration (C) although the outstanding genotypes were NA-5909 and BRS7280 for this parameter. The three genotypes behaved similarly over the four water irrigation levels, consequently there was a decrease in net carbon gain when water levels decreased. Also, the transpiration and stomatal conductance factors behaved similarly to the net carboxylation rate (FIGS. 4 and 5).

Figure 4:
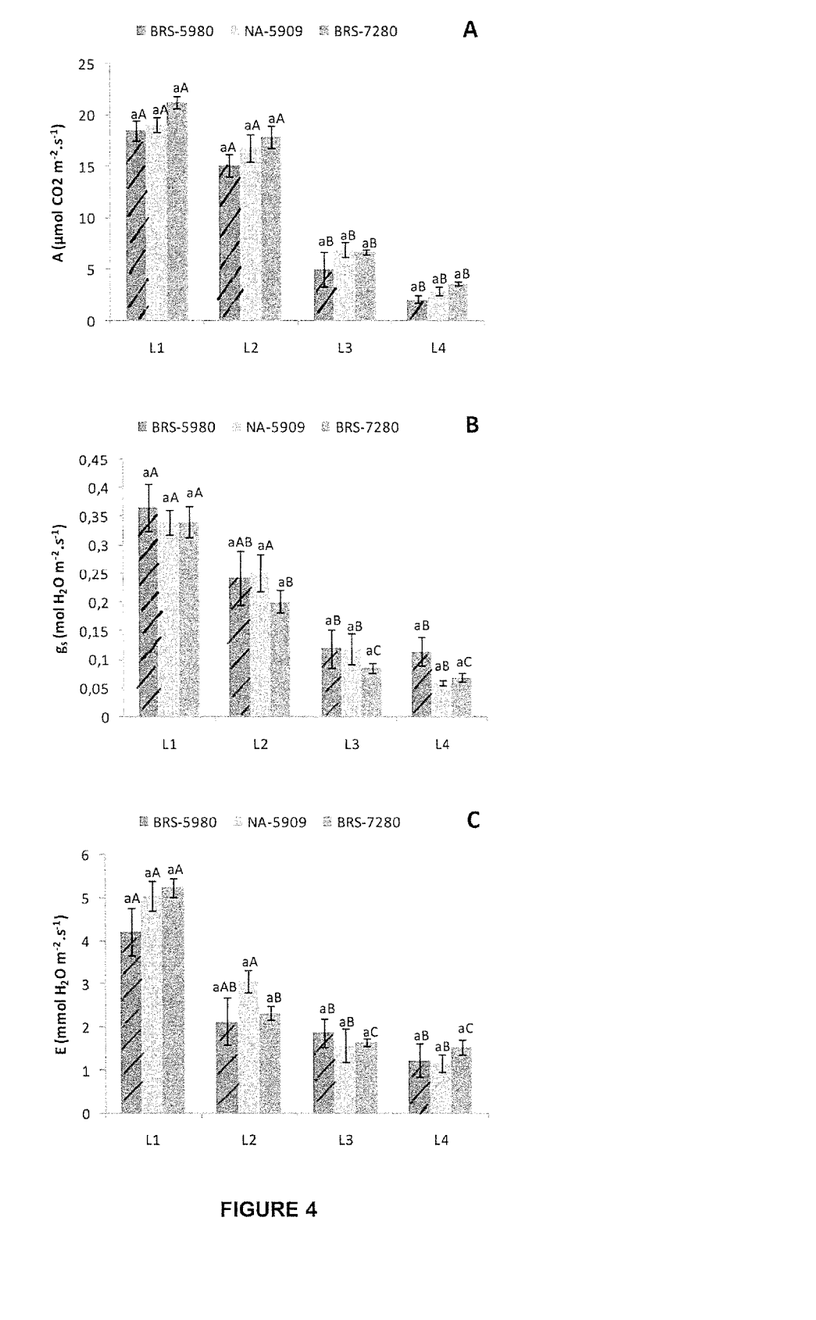
FIG. 4 shows measurements of the photosynthesis (A), stomatal conductance (B) and transpiration (C) in the soybean crop for the experiment without the use of any cross-linked polymer, in accordance with the prior art. Lower case letters compare the three genotypes within each water level and uppercase letters compare each genotype within the four water levels.
Figure 5:
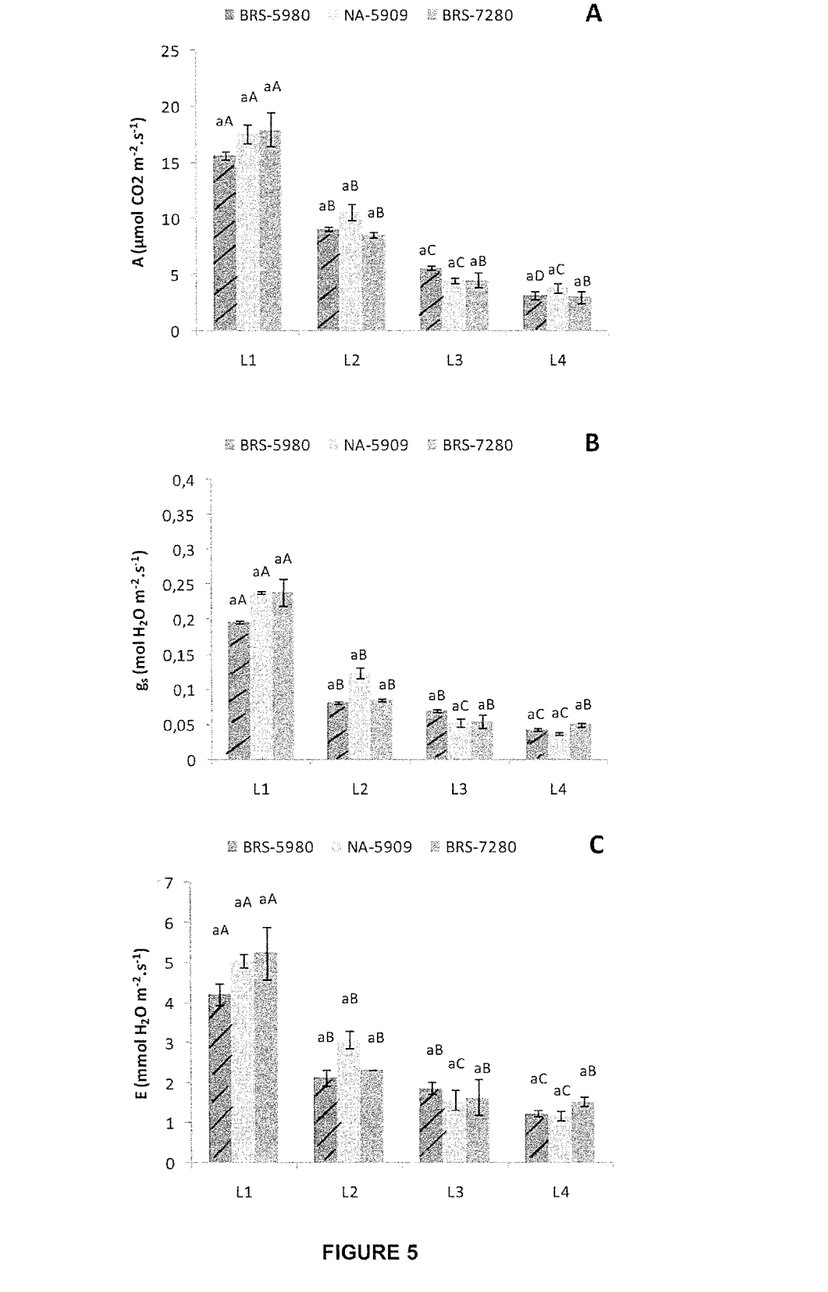
FIG. 5 shows measurements of the photosynthesis (A), stomatal conductance (B) and transpiration (C) in the soybean crop, in an experiment carried out with the use of the cross-linked polymer in accordance with a further embodiment of the present disclosure, when submitted to increasing levels of water deficit. Lower case letters compare the three genotypes within each water level and uppercase letters compare each genotype within the four water levels.

Comparing the data which is presented in FIGS. 4 and 5, it was found that in the experiment in which the polymer was not added, the measurements showed that photosynthesis, stomatal conductivity and transpiration were apparently only a little higher for the 3 genotypes and for all irrigation levels. However, in terms of productivity (yield), these differences only manifested at the most stressed level of irrigation (as known from FIG. 3).

Figure 6:
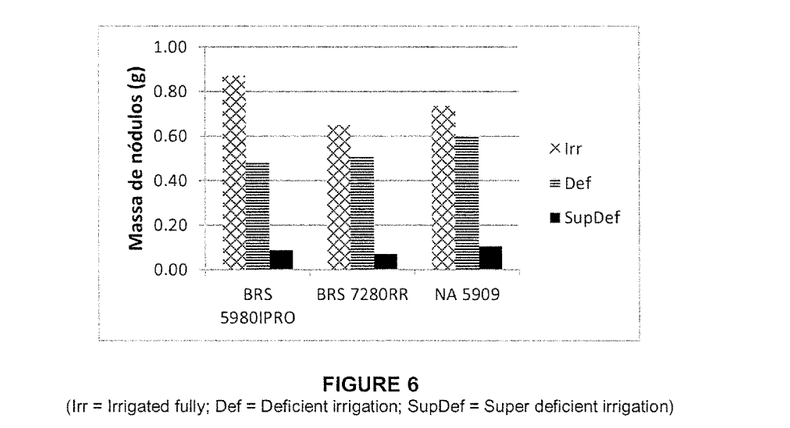
FIG. 6 shows measurements of the response to irrigation and drought tolerance in terms of mass of nodules in three soybean genotypes and at three irrigation levels, in accordance with the prior art.
Figure 9:
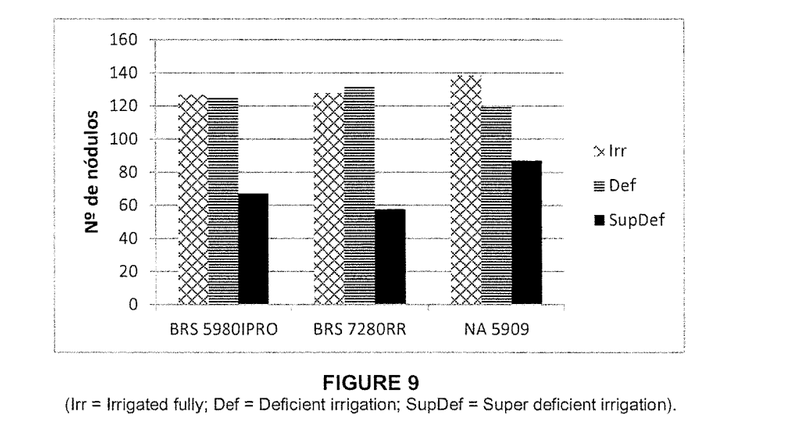
FIG. 9 shows measurements of the response to irrigation and drought tolerance in terms of the number of nodules in three soybean genotypes and at three irrigation levels, in accordance with the prior art.

The water irrigation level affected nodule mass in all genotypes, but in the irrigated treatment, the genotype BRS5980IPRO was more responsive to the addition of water (FIG. 6), being the most productive material in irrigated conditions (FIG. 1). Comparing the mass, and the number of nodules, in the water levels (FIGS. 6 and 9), the differences between all genotypes were less drastic as measured by the number of nodules, especially in the higher levels of irrigation.

Figure 7:
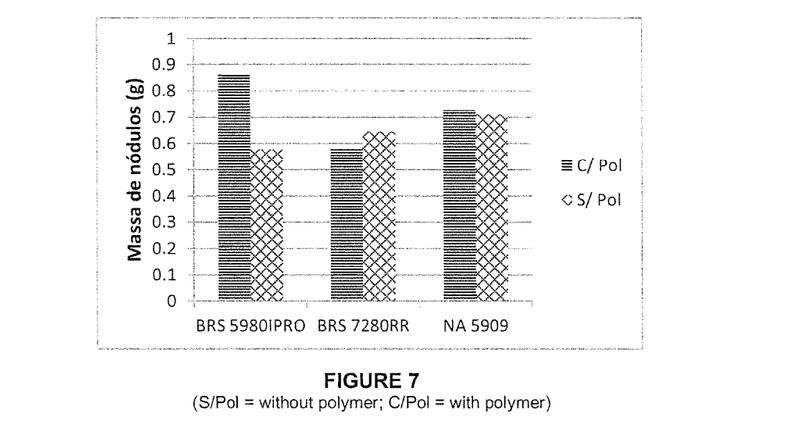
FIG. 7 shows measurements of the mass of nodules in three soybean genotypes on average of three levels of irrigation, both without the use of cross-linked polymer, in accordance with the prior art, and with the use of cross-linked polymer, in accordance with a further embodiment of the present disclosure.
Figure 10:
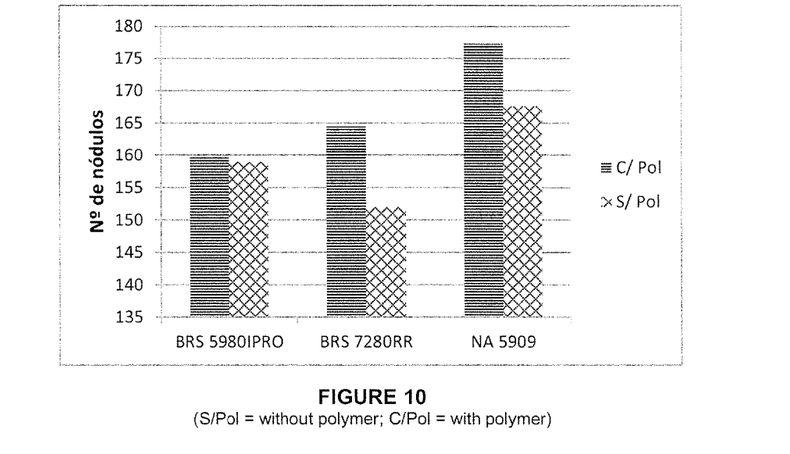
FIG. 10 shows measurements of the number of nodules in three soybean genotypes in the mean of three levels of irrigation, both without the use of cross-linked polymer, in accordance with the prior art, and with the use of cross-linked polymer, in accordance with a further embodiment of the present disclosure.

The use of a cross-linked polymer only increased the mass of nodules in genotype BRS5980IPRO (FIG. 7), a tendency that completely changed for number of nodules (FIG. 10), when the use of the cross-linked polymer was observed to increase the number of nodules for genotypes BRS72800RR and NA5909.

Figure 8:
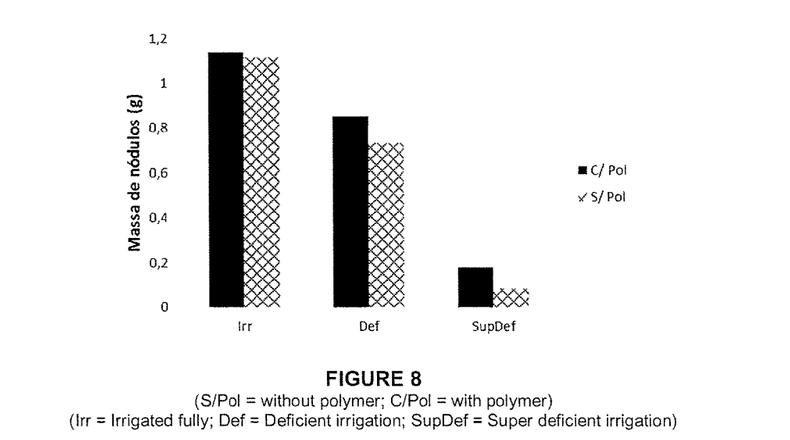
FIG. 8 shows measurements of the mass of nodules on average of three soybean genotypes at three levels of irrigation, both without the use of cross-linked polymer, in accordance with the prior art, and with the use of cross-linked polymer, in accordance with a further embodiment of the present disclosure.
Figure 11:
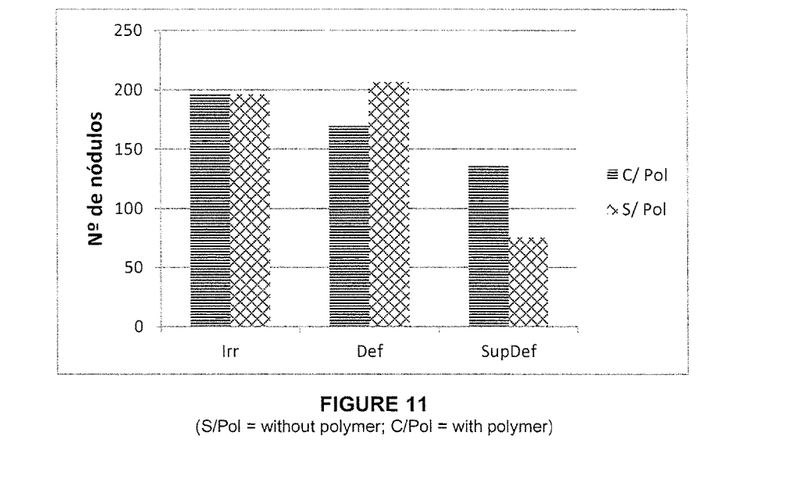
FIG. 11 shows measurements of the number of nodules in the average of three soybean genotypes at three levels of irrigation, both without the use of cross-linked polymer, in accordance with the prior art, and with the use of cross-linked polymer, in accordance with a further embodiment of the present disclosure.

According to FIG. 8, the mass of nodules on average was positively affected by the polymer mainly in those irrigation situations where there was a water deficiency. According to FIG. 11, the number of nodules was positively affected by the polymer only in those irrigation situations where there was a severe water deficiency. Both of these are good indicators that treatment of the soil with a cross-linked polymer worked.

TABLE 1

Results for the effects of Blocks, Water Levels, Genotypes and their Interactions for the parameters of gas exchange (Photosynthesis (A), Stomatal Conductance (gs), Internal CO2 Concentration (Ci) and Transpiration (Trammol)), morphological, agronomic and productivity parameters (Grain Density, Thousand Grain Weight (P.1000 Grains), Number of pods (Number of Grains), Diameter and Height) and water potential at noon and at noon (MPa) for the experiment without cross-linked polymer.

|  | BLOCK | WATER | GENOTYPE | BLOCK*WATER | WATER*GENOTYPE |
|---|---|---|---|---|---|
| A | $0.2936^{ns}$ | $<.0001**$ | $0.0655^{ns}$ | $0.5967^{ns}$ | 0.9663ns |
| gs | $0.0017**$ | $<.0001**$ | $0.2021^{ns}$ | $0.3441^{ns}$ | 0.8842ns |
| Ci | $0.0079**$ | $0.0022**$ | $0.0066**$ | $0.4206^{ns}$ | 0.8152ns |
| Trammol | $0.0969^{ns}$ | $<.0001**$ | $0.4491^{ns}$ | $0.0563^{ns}$ | 0.6391ns |
| Grain density | $0.0722^{ns}$ | $0.0013**$ | $0.2324^{ns}$ | $0.5060^{ns}$ | $0.0001**$ |
| P1000 Grains | $0.1823^{ns}$ | $<.0001**$ | $<.0001**$ | 0.4751ns | $0.0087**$ |
| N° Vagens | $0.4730^{ns}$ | $<.0001**$ | $0.0144*$ | 0.4262ns | 0.7899ns |
| Number of Grains | $0.4360^{ns}$ | $<.0001**$ | $0.0221*$ | 0.1073ns | 0.3271ns |
| Diameter | $0.1228^{ns}$ | $<.0001**$ | $0.9289^{ns}$ | 0.6194ns | 0.2882ns |
| Height | $0.1117^{ns}$ | $<.0001**$ | $<.0001*$ | 0.5224ns | 0.0814ns |

TABLE 2

Results for the effects of Blocks, Water Levels, Genotypes and their Interactions for the parameters of gas exchange (Photosynthesis (A), Stomatal Conductance (gs), CO2 Internal Concentration (Ci) and Transpiration (Trammol)), morphological, agronomic and productivity parameters (Grain Density, Grain Density, Thousand Grain Weight (P.1000 Grains) and Number of pods (Number of Grains), Diameter and Height).

|  | BLOCK | WATER | GENOTYPE | BLOCK*WATER | WATER*GENOTYPE |
|---|---|---|---|---|---|
| A | $0.0812^{ns}$ | $<.0001**$ | $0.4840^{ns}$ | $0.0860^{ns}$ | $0.4193^{ns}$ |
| gs | $0.8156^{ns}$ | $<.0001**$ | $0.2823^{ns}$ | $0.2744^{ns}$ | $0.1222^{ns}$ |
| Ci | $0.0611^{ns}$ | $0.0376*$ | $0.8115^{ns}$ | $0.4013^{ns}$ | $0.2313^{ns}$ |
| Trammol | $0.0823^{ns}$ | $<.0001**$ | $0.0846^{ns}$ | $0.0253*$ | $0.0448*$ |
| Grain density | $0.0636^{ns}$ | $0.0314*$ | $0.0197*$ | $0.3127^{ns}$ | $0.2698^{ns}$ |
| P1000 Grains | $0.8535^{ns}$ | $<.0001**$ | $<.0001**$ | $0.5294^{ns}$ | $0.0517^{ns}$ |
| N° Vagens | $0.8006^{ns}$ | $<.0001**$ | $0.0119*$ | $0.0393*$ | $0.0326*$ |
| Number of Grains | $0.0012**$ | $<.0001**$ | $0.3103^{ns}$ | $0.2364^{ns}$ | $0.5932^{ns}$ |
| Diameter | $0.1603^{ns}$ | $<.0001**$ | $0.6215^{ns}$ | $0.0239*$ | $0.9726^{ns}$ |
| Height | $0.0330*$ | $<.0001**$ | $<.0001**$ | $0.1253^{ns}$ | $0.1593^{ns}$ |

Other pre-determined nutrients, minerals, bacteria and trace elements are also able to be blended together with the X-CMC hydrogel during its production, prior to its addition to the soil, so as to enable enhanced agricultural outcomes. In this way, the X-CMC hydrogel acts as a carrier host for other water-borne substances which the plant can benefit from, typically known as "co-factors", which are released with the retained water for take-up by the plant. For soybean production, the co-factor can be any of the group comprising: nutrients, fertilisers (NPK, or PK only), pesticides, microorganisms, essential elements, and nitrogen-fixing bacteria including Rhyzobia inoculation.

In one exemplary embodiment from the experimental trials, a co-factor which is known to propagate soybean growth and to increase harvestable yield is the nitrogen-fixing bacteria Rhyzobia in the soil. Rhyzobia inoculation is a long-standing practice in agriculture to improve soils which have poor nitrogen fixation. Inoculation of the soil was performed by using the X-CMC hydrogel particulates as a carrier for Rhyzobia, which was added to the hydrogel material during its formation. It is understood that the most suitable bacteria is usually specific to a plant species.

By the use of the X-CMC hydrogel as a water retention agent to maintain soil moisture, the experiments showed a synergistic effect in which the population of Rhyzobia bacteria was able to be stabilised over the growth cycle, which was good for plant growth and yield. Furthermore, it was also observed that the use of X-CMC hydrogel as a water retention agent meant that the bacteria in the soil remained alive after harvesting through to the next sowing and growing cycle, because the soil remained damp and did not dry out.

The inventor has discovered that the use of a non-synthetic/semi-synthetic hydrogel water retention agent to enhance the yield of the example crop of soybeans produced the following beneficial outcomes, in comparison to a crop where there was no such agent used:

After initial water penetration from irrigation or rainfall following seeding, a lower overall volume of irrigation water was required to produce a healthy crop since excess water from any irrigation event could be taken up by the hydrogel rather than being lost through leaching beyond the root zone;

The length of time needed for an irrigation event was lessened, and the required time period between irrigation/rain events was lengthened;

Less fertiliser was required, which the inventor believes is because of improved nitrogen fixation (that is, less nitrate run-off);

Less herbicide was required, for similar reasons as the previous point, thereby improving the physical properties of soil to support a crop;

Nitrogen-fixing bacteria level (which are essential for legumes and other crops) were measured, and found to be maintained at viable, stable levels in the soil, which the inventor believes was due to less leaching of co-factors from the soil;

Helps plants withstand prolonged moisture stress, and can delay onset of permanent wilting point;

The plants appeared healthier overall and produced a higher yield of product;

There was an increased in the weight of beans per crop when harvested; and

The time required to harvesting was less, which may lead to additional annual plantings (depends on the crop and location), which the inventor believes was because plant growth did not go through period of dormancy which can occur when water availability is low.

Some of the advantages noted for the farmer included:

Less reliance on irrigation or regular rainfall, as a water source is already present at the root zone;

After initial water penetration from irrigation or rainfall following seeding, swelling of the hydrogel can result in closure of cracks and fissures in the soil which in turn reduces the leaching of water from the root zone;

The X-CMC hydrogel is a biodegradable, non-toxic and a renewable resource, which continues to function for at least one growing cycle, but ultimately leaves no residual matter in the soil;

Viable levels of Rhyzobia bacteria can be retained in the soil between growing cycles; and There is also some applicability of the method for improving seed germination and growth in formation of seedling plants.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The preceding description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope and spirit of the disclosed embodiments, the embodiments being illustrative and not restrictive.

Furthermore, the inventions have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realise yet other embodiments. Further, each independent feature or component of any given assembly may constitute an additional embodiment.

The invention claimed is:

1. A method of in-situ retention and buffering of an amount of water in soil to support the growth of an agricultural crop, the method comprising the steps of:
adding an effective amount of a hydrogel material as a water retention agent during planting of seed in the soil, said hydrogel material being added as a flow of dry particulates at a location where a root zone of the agricultural crop will form; and
causing or allowing penetration of water into the soil after the planting of seed so that a proportion of the water which penetrates the soil is absorbed by the hydrogel material and, over time, the absorbed water is released by diffusion into the soil to support the growth of the agricultural crop,
wherein the hydrogel material comprises an insoluble cross-linked carboxymethyl cellulose hydrogel together with an amount of ionic solid particulates which are impregnated into and bound by the hydrogel, the ionic solid comprising no more than 10% w/w of said hydrogel material.

2. The method as claimed in claim 1, wherein the hydrogel material comprises said carboxymethyl cellulose which has been cross-linked with a cross-linking polymer selected from the group consisting of: an amine monomer; an amide monomer; and an amine-amide co-polymer.

3. The method as claimed in claim 2, wherein the amide monomer is selected from the group consisting of: acrylamide; methacrylamide; ethacrylamide; isopropylacrylamide; diacetoneacrylamide; bisacrylam ides; acrylic acid; acrylate; acrylonitrile; and acrylamido-propanesulfonic acid.

4. The method as claimed in claim 2, wherein the amine monomer or amine-amide co-polymer is selected from the group consisting of: polyallylamine hydrochloride; polyvinylamine (PVAm); polyvinylformamide (PNVF); and poly (vinylformamide-co-vinylamine) co-polymers.

5. The method as claimed in claim 1, wherein the ionic solid is selected from the group consisting of: sodium hydrogen carbonate and sodium carbonate.

6. The method as claimed claim 1, wherein the carboxymethyl cellulose comprises from 3 to 85% w/w of the hydrogel material.

7. The method as claimed in claim 2, wherein the cross-linking polymer comprises from 1 to 25% w/w of the hydrogel material.

8. The method as claimed in claim 1, wherein the ionic solid comprises from 1 to 10% w/w of the hydrogel material.

9. The method as claimed in claim 1, wherein the hydrogel material is added into the soil in a first step, and the seed is added into the soil in a second step at a location above the hydrogel material.

10. The method as claimed claim 1, wherein the effective amount of the hydrogel material added to the soil is at a predetermined rate of from 1.0 to 10.0 kg per hectare.

11. The method as claimed in claim 1, wherein the form of the dry particulate hydrogel material is selected from the group consisting of: a pellet, a granular particle, a powder and a crystal.

12. The method as claimed in claim 1, wherein the method further comprises the step of supplying at least one co-factor with the hydrogel material when it is added to the soil, to increase agricultural crop yield.

13. The method as claimed in claim 12, in which the co-factor is absorbed into the hydrogel material prior to adding the hydrogel to the soil, wherein the co-factor is selected from the group consisting of: nutrients, fertilisers, pesticides, microorganisms and nitrogen-fixing bacteria, including Rhyzobia inoculation, and combinations thereof.

14. A method as claimed in claim 1, wherein the carboxymethyl cellulose has a degree of substitution of the cellulose structure (carboxymethyl groups per cellulose monomer unit) of about 1.2.

\* \* \* \* \*